United States Patent [19]

Li

[11] Patent Number: 5,592,569

[45] Date of Patent: *Jan. 7, 1997

[54] METHOD FOR ENCODING AND DECODING IMAGES

[75] Inventor: Weiping Li, Bethlehem, Pa.

[73] Assignee: Competitive Technologies, Inc., Westport, Conn.

[*] Notice: The term of this patent shall not extend beyond the expiration date of Pat. No. 5,436,985.

[21] Appl. No.: 439,566

[22] Filed: May 11, 1995

Related U.S. Application Data

[63] Continuation of Ser. No. 60,130, May 10, 1993, Pat. No. 5,436,985.

[51] Int. Cl.$^6$ ........................................................ G06K 9/36
[52] U.S. Cl. ................................................ 382/253; 382/233
[58] Field of Search ................................. 382/253, 251, 382/233, 232; 348/403, 404, 405

[56] References Cited

U.S. PATENT DOCUMENTS

| | | | |
|---|---|---|---|
| 5,101,438 | 3/1992 | Kanda et al. | 382/9 |
| 5,247,357 | 9/1993 | Israelsen | 358/133 |
| 5,436,985 | 7/1995 | Li | 382/253 |

OTHER PUBLICATIONS

Youtkus, D. et al., "An Image Coding Algorithm in the Vector Transform Domain" Proceedings of the 1992 IEEE International Symposium on Circuits and System, San Diego, CA May 10–13, 1992.

Slawecki, D. et al. "DCT/IDCT Processor Design for High Data Rate Image Coding" IEEE Transactions on Circuits and System for Video Technology, vol. 2, No. 2, pp. 135–146. Jun. 1992.

Li, W. et al "A High Speed 2-D DCT/IDCT Processor". 1991.

Li, W. "A New Algorithm to Compute the DCT and its Inverse" IEEE Transactions on Signal Processing, vol. 39, No. 6, Jun. 1991.

Bedros et al "Subband Coding of Images Using Transform Vector Quantization", IEEE, 1990, pp. 341–344.

He et al "An Adaptive Image Coding Technique Using Interpolative Mixed VQ", IEEE ISCS, 1992, pp. 2300–2303.

Du "Scene Adaptive Vector Quantization", IEEE 3rd Conference on Image Processing and Application, 1989, pp. 571–575.

Linde et al "An Algorithm for Vector Quantizer Design", IEEE Transactions on Communication, vol. COM–28, No. 1, Jan. 1980, pp. 84–95.

*Primary Examiner*—Yon J. Couso
*Attorney, Agent, or Firm*—Martin Novack

[57] ABSTRACT

A technique for encoding and decoding an image includes the following steps: subsampling the image to obtain a number of subsampled frames of spatially offset image-representative signals; transforming each of the subsampled frames to obtain a corresponding number of frames of transform coefficient-representative signals; forming vector-representative signals from corresponding coefficient-representative signals of the respective frames of coefficient-representative signals; performing a thresholding operation on the vector-representative signals to obtain thresholded vector-representative signals; vector quantizing the thresholded vector-representative signals to obtain encoded signals; storing the encoded signals; and decoding the encoded signals to obtain a recovered version of the image.

8 Claims, 13 Drawing Sheets

VECTOR BEFORE THRESHOLDING

FIG. 5A

VECTOR AFTER THRESHOLDING

FIG. 5B $$\begin{bmatrix} 0 & 10 & 10 & - & - & - & - & - & - \\ 10 & 15 & 15 & - & - & - & - & - & - \\ 10 & 10 & 20 & & & & & & \\ 10 & 10 & 25 & & & & & & \\ | & & & & & & | & | \\ | & & & & & & | & | \\ | & & & & & & | & | \\ | & & & & & - & - & - & 35 & 35 \\ | & & & & & - & - & - & 30 & 30 \end{bmatrix}$$

EXAMPLE OF THRESHOLD MAP FOR 64 DCT COEFFICIENTS

FIG. 6

$$\begin{bmatrix} () & () & () & () \\ () & - & - & - \\ () & - & - & - \\ () & - & - & - \end{bmatrix}_{4 \times 4}$$

VECTOR BEFORE
SHRINKING

FIG. 7A $$\begin{bmatrix} () & () \\ () & () \end{bmatrix}_{2 \times 2}$$

VECTOR AFTER
SHRINKING

METHOD FOR ENCODING AND DECODING IMAGES

This is a continuation of U.S. application Ser. No. 08/060,130 filed May 10, 1993 now U.S. Pat. No. 5,436,985.

FIELD OF THE INVENTION

This invention relates to compression of image-representative signals and, more particularly, to an apparatus and method for encoding and decoding image-representative signals.

BACKGROUND OF THE INVENTION

Image-represenative signals can be digitized, encoded, and subsequently decoded in a manner which substantially reduces the number of bits necessary to represent a decoded reconstructed image without undue or noticeable degradation in the reconstructed image.

Image coding is an essential part of many applications such as digital television transmission, video conferencing, facsimile, image database, etc. The simplest technique for this purpose is pulse code modulation (PCM). A PCM system encodes individual pixels of an image in a memoryless way, i.e., it does not use any correlation information between pixels. An improvement over the PCM technique can be made by taking advantage of the correlations between pixels. Predictive coding is one of the techniques based on this principle. It quantizes the difference between a pixel and a prediction of the pixel from its neighbor pixels. Transform coding is another type of technique based on the same principle. In transform coding, a block of data samples is transformed from the image domain to the transform domain using an orthogonal transform, such as the discrete cosine transform (DCT). Two properties of the transform domain coefficients are used. One is that the transform domain coefficients have fewer correlations than the original data samples so that they can be coded individually. The other property is that the energy is packed into a few lower order coefficients so that many higher order coefficients can be either coded with very few bits or discarded.

All of these techniques perform coding on scalars, either in the image domain or in the transform domain. As Shannon's rate-distortion theory indicates, better performance can be achieved by coding vectors instead of scalars, many vector quantization (VQ) techniques have been developed. The memoryless VQ technique is a vector generalization of PCM. It divides an image into blocks, each block is considered as a vector, and each vector is coded in a memoryless way without considering the correlations between the vectors. Similar to the scalar quantization, an improvement over the memoryless VQ can be made by taking into account the correlations between vectors. Based on this principle, predictive VQ has been studied.

In general, a rationale for using a transform such as DCT includes the objective of generating transform coefficients having relatively little correlation with each other so that scalar quantizing efficiency is maximized. It has been recognized that vector quantization can be used on DCT coefficients, but since vector quantization performance is enhanced by the presence of correlation among the components being quantized, such enhancement has proven to be limited when vector quantizing DCT coefficients (because of the inherent low correlation between DCT coefficients).

It is an object of the present invention to overcome this limitation of prior art approaches and to provide an improved encoding/decoding technique and apparatus that can take full advantage of the attributes of both DCT processing and vector quantization.

SUMMARY OF THE INVENTION

In accordance with an embodiment of the method of the invention, there is provided a technique for encoding and decoding an image, comprising the following steps: subsampling the image to obtain a number of subsampled frames of spatially offset image-representative signals; transforming each of the subsampled frames to obtain a corresponding number of frames of transform coefficient-representative signals; forming vector-representative signals from corresponding coefficient-representative signals of the respective frames of coefficient-representative signals; performing a thresholding operation on the vector-representative signals to obtain thresholded vector-representative signals; vector quantizing the thresholded vector-representative signals to obtain encoded signals; storing the encoded signals; and decoding the encoded signals to obtain a recovered version of the image.

Further features and advantages of the invention will become more readily apparent from the following detailed description when taken in conjunction with the accompanying drawings.

DETAILED DESCRIPTION

Figure 1:
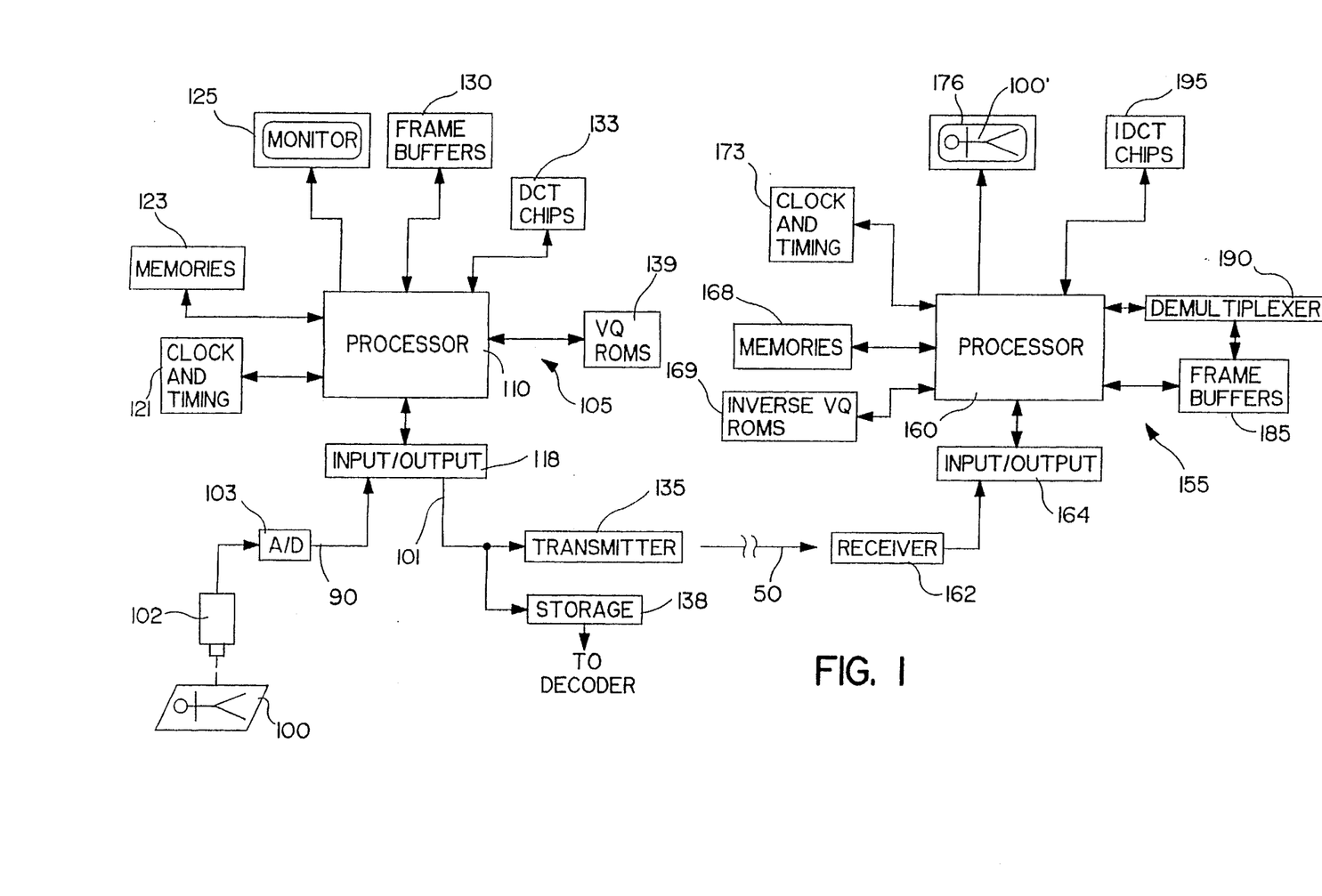
FIG. 1 is a block diagram of an apparatus which can be used to practice an embodiment of the invention.

Referring to FIG. 1, there is shown a block diagram of an apparatus in accordance with an embodiment of the invention for encoding and decoding an image 100. A scanner or a video camera 102 produces an array of pixel-representative signals that are coupled to an analog-to-digital converter 103, which is, in turn, coupled to the processor 110 of an encoder 105. When programmed in the manner to be described, the processor 110 and its associated circuits can be used to implement an embodiment of the invention and to practice an embodiment of the method of the invention. The processor 110 may be any suitable processor, for example an electronic digital or analog processor or microprocessor. It will be understood that any general purpose or special purpose processor, or other machine or circuitry that can perform the functions described herein, electronically, optically, or by other means, can be utilized. The processor 110, which for purposes of the particular described embodiments hereof can be considered as the processor or CPU of a general purpose electronic digital computer, such as a Model SparcStation-1 sold by Sun Microsystmes, Inc., will typically include memories 123, clock and timing circuitry 121, input/output functions 118 and monitor 125, which may all be of conventional types. In the present embodiment, frame buffers 130, discrete cosine transform (DCT) chips 133, and read-only memories (ROMs) 139, which may all be of commercially available types, are also coupled with the processor 110.

With the processor appropriately programmed, as described hereinbelow, an encoded output signal 101 is produced which is a compressed version of the input signal 90 and requires less bandwidth and/or less memory for storage. In the illustration of FIG. 1, the encoded signal 101 is shown as being coupled to a transmitter 135 for transmission over a communications medium (e.g. air, cable, fiber optical link, microwave link, etc.) 50 to a receiver 162. The encoded signal is also illustrated as being coupled to a storage medium 138, which may alternatively be associated with or part of the processor subsystem 110, and which has an output that can be decoded using the decoder to be described.

Coupled with the receiver 162 is a decoder 155 that includes a similar processor 160 and associated peripherals and circuits of similar type to those described in the encoder. These include input/output circuitry 164, memories 168, clock and timing circuitry 173, and a monitor 176 that can display a decoded image 100'. Also provided are inverse discrete cosine transform (IDCT) chips 195, frame buffers 185, a demultiplexer 190, and ROMs 169, which may all be of commercially available types.

Figure 3:
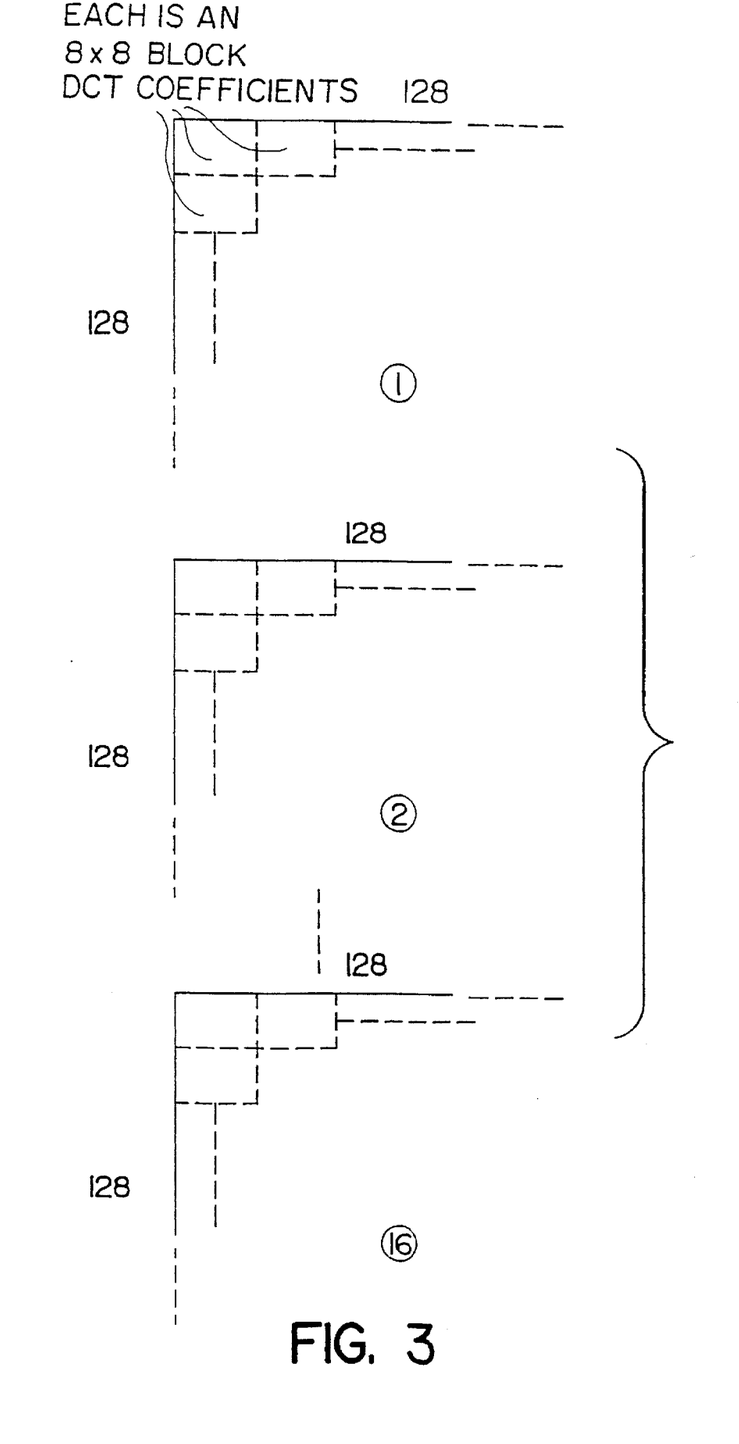
FIG. 3 is a diagram illustrating transform coefficients in an arrangement that can be used in an embodiment of the invention.
Figure 4:
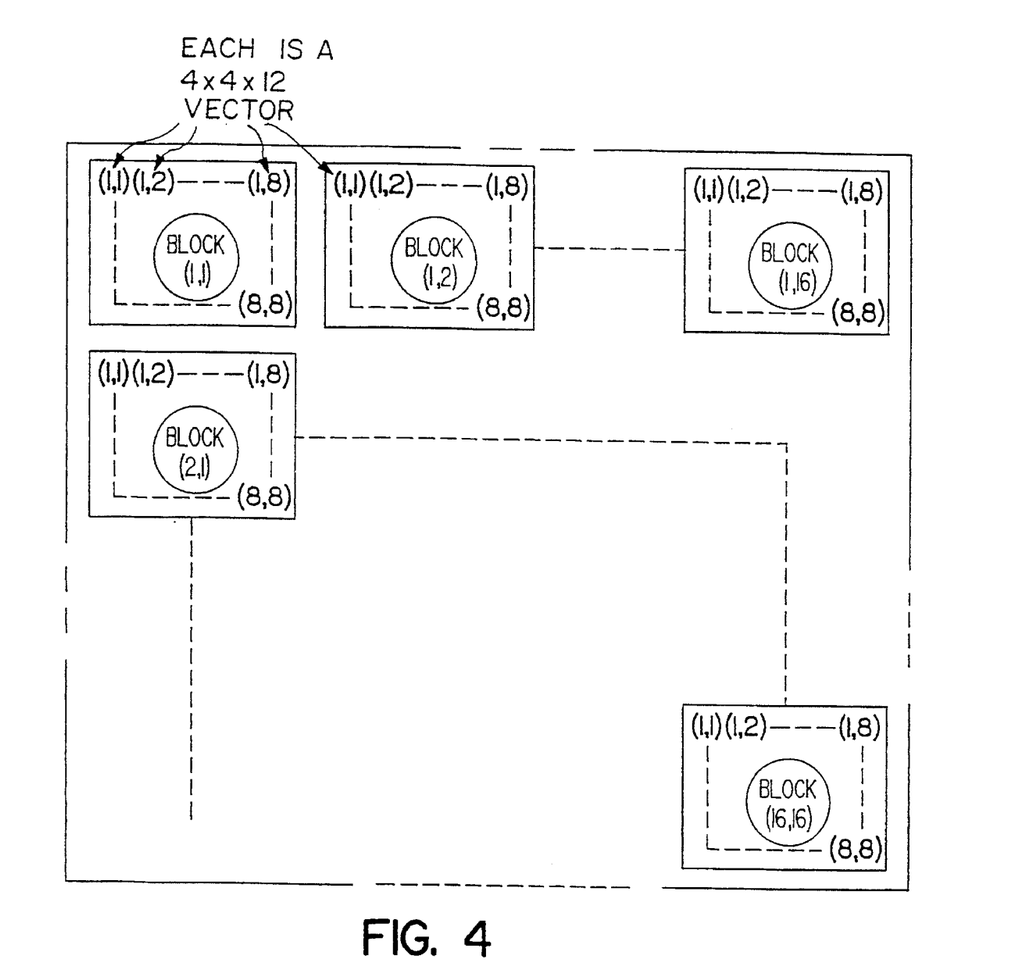
FIG. 4 is a diagram of an arrangement of signal-representative vectors that can be utilized in an embodiment of the invention.

In an example of the present embodiment, the original image processed by the encoder 105 is 512×512 pixels and subsampling produces 16 subsampled images of 128×128 pixels. This is represented pictorially in FIG. 2. Transformation of each of the subsampled images to the transform domain is then implemented. Any suitable transform can be employed, but it can be convenient and advantageous to utilize a conventional discrete cosine transform (DCT) routine, as implemented using a commercially available DCT chip. In an example hereof, each subsampled 128×128 image is divided into 8×8 blocks (i.e., 16×16 of such blocks), and each 8×8 block is DCTed to obtain 8×8 DCT coefficients (i.e., sixty-four DCT coefficients) for each such block (see FIG. 3). In the present example, each DCT coefficient is represented by 12 bits. It can be observed that since corresponding blocks of the subsampled images are from generally corresponding regions of the original image, there will generally be correlation between DCT coefficients of such corresponding blocks. Vector formation from corresponding blocks is then implemented by forming vectors from corresponding coefficients of such corresponding blocks. For example, a first vector can be visualized as containing the coefficient information from the coefficient position (1,1) of the top left 8×8 block of each of the transformed subsampled images. Thus, altogether, there will be 128×128 vectors, with each vector being 4×4×12. The vectors can be visualized as being arranged in a 16×16 array of 8×8 blocks, as illustrated in FIG. 4.

Figure 5A:
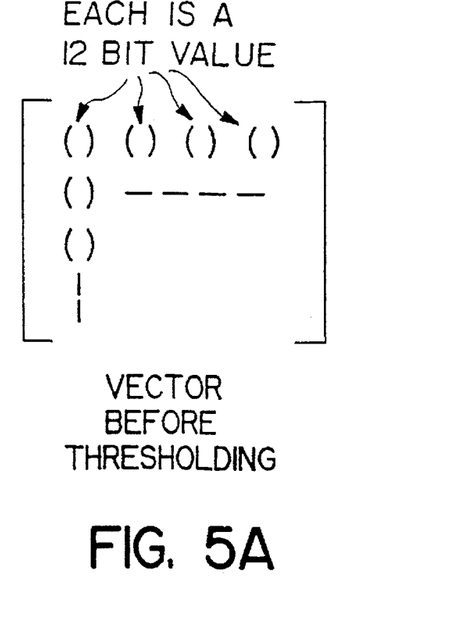
FIGS. 5A–B are diagrams illustrating vector thresholding that can be utilized in an embodiment of the invention.
Figure 5B:
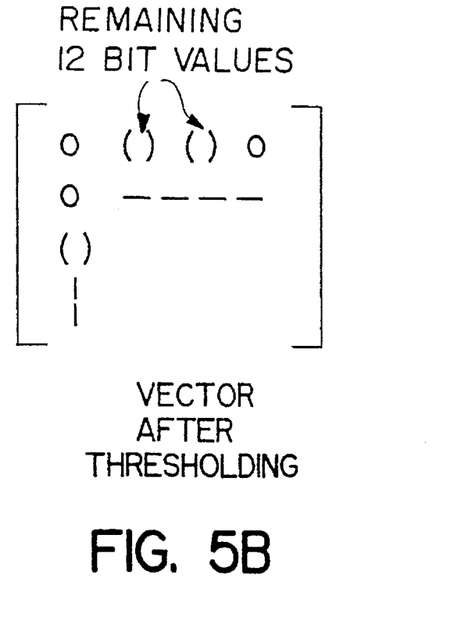
Figure 6:
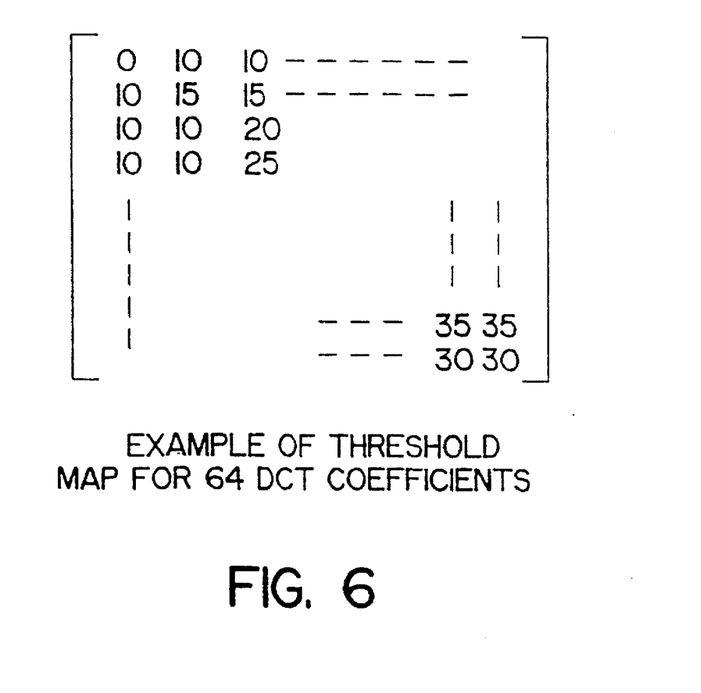
FIG. 6 shows an example of a threshold map for transform coefficients of a type that can be utilized in an embodiment of the invention.
Figure 7A:
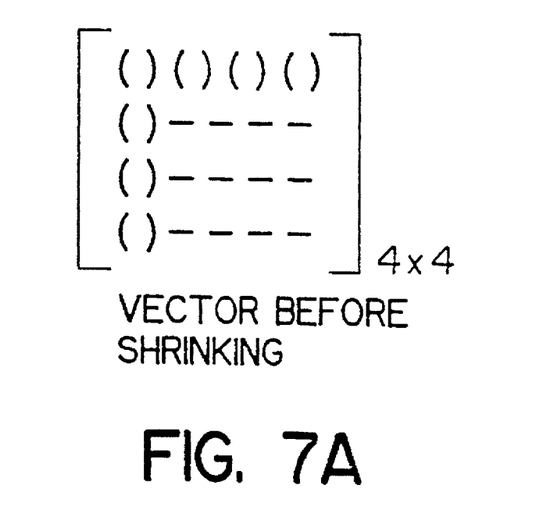
FIG. 7 is a diagram illustrating vector shrinking of a type that can be utilized in an embodiment of the invention.
Figure 7B:
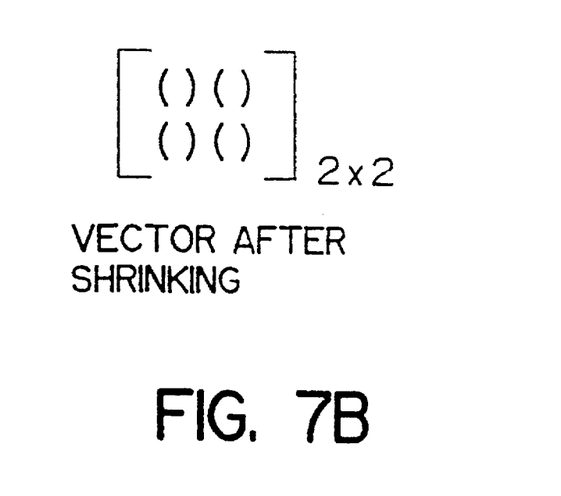

In the present embodiment, thresholding and vector quantization are next implemented to substantially reduce the number of bits needed to represent the original image. Various types of thresholding can be employed. In the illustration of the present embodiment, thresholding includes determination of vector "length" (or the square of length, "energy"), the retaining of vector information for vectors having lengths greater than predetermined values, and the discarding of other vectors and replacement thereof with zeros (see the illustration of FIGS. 5A and 5B). As is known in the art, the threshold value for each of the 64 DCT coefficients can be determined from a threshold map, such as the 8×8 threshold map shown in FIG. 6. See, for example, Youtkus and Li, Proc. IEEE Int. Symp. on Circuits and Systems, San Diego, Calif., May 10–13, 1992, for the full map, which can be optimized for the human visual system. If desired, a "shrinking" of vector sizes can also be implemented, such as in situations where the resolution of the ultimately reconstructed image can acceptably be a predetermined fraction of the resolution of the original image. For example, in an illustration hereof, the original image is 512×512 pixels, and the reconstructed image could also be 512×512 pixels or, say, only 256×256 pixels. In the latter case, where there are to be one-fourth the original number of pixels in the ultimately reconstructed image, the 4×4×12 vectors can be shrunk to 2×2×12. FIG. 7A shows a representation of a 4×4×12 vector before shrinking, and FIG. 7B shows a representation of the vector, of size 2×2×12, after shrinking. Shrinking can be implemented, for example, by retaining only the four largest of the sixteen coefficients in the original 4×4×12 vector. The vector can be thresholded, as previously described, after shrinking.

In the illustrated embodiment hereof, the thresholded vectors are then processed using a vector quantization routine. As is known in the art, vector quantization is a technique of coding whereby multidimensional vectors are represented by a limited number of code words (the collection of code words sometimes being referred to as a "code book") If, say, there are only 64 words in the code book, they can be distinguished using only 6 bits. Each 2×2×12 vector (48 bits) may be represented (without undue degradation in the ultimately reconstructed image) by a 6 bit (or other selected number of bits) code word representing one of the 64 code words (or other selected number of code words) in the code book. For a given vector to be quantized, the vector quantization technique selects the code word in the code book that is closest (that is, the least different, based on a least squares computation). A different code book can be utilized for each of the 64 DCT coefficients represented by the various vectors. Only non-zero vectors are quantized. For further reference to vector quantization, reference can be made to Linde et al., An Algorithm for Vector Quantizer Design, IEEE Transactions on Communications, Vol. Com-28, No. 1, Jan. 1980.

After vector quantization, the encoded output bit stream (for storage and/or transmission) comprises, for each zero vector, a single bit "0", and, for each quantized vector, a bit "1" followed by the quantized code. The vectors are sent in a predetermined sequence.

After receiving a stored and/or transmitted bit stream, the decoder 155 (FIG. 1) operates to decode the bit stream with substantially the inverse of the process just described. After storing the vector-representative signals received in predetermined order, the code words for all non-zero vectors are translated back to vector values using the same 64 code books as were used at the encoder. In this case, ROMs can be employed, each ROM having (for this illustration) a 6 bit input which receives the code word, and a 48 bit output which represents a 2×2×12 vector. The stored vector values are then decomposed (the inverse of the above-described vector formation) into DCT coefficient values associated with blocks of individual frame components. [If the above-referenced "shrinking" is used, there will be four offset frames (like four of the sixteen offset subsampled frames previously described with regard to the encoder (see e.g. FIG. 2).] This can be implemented in hardware using a demultiplexer (reference numeral 190 of FIG. 155), and the resultant DCT coefficients are inverse-DCTed using an IDCT chip, represented at 195 in FIG. 1. This results in obtainment of offset frames (e.g. four offset frames in this example), which can be combined into the reconstructed image-representative pixels in a frame buffer 185 and then, for example, displayed on monitor 176.

Figure 8:
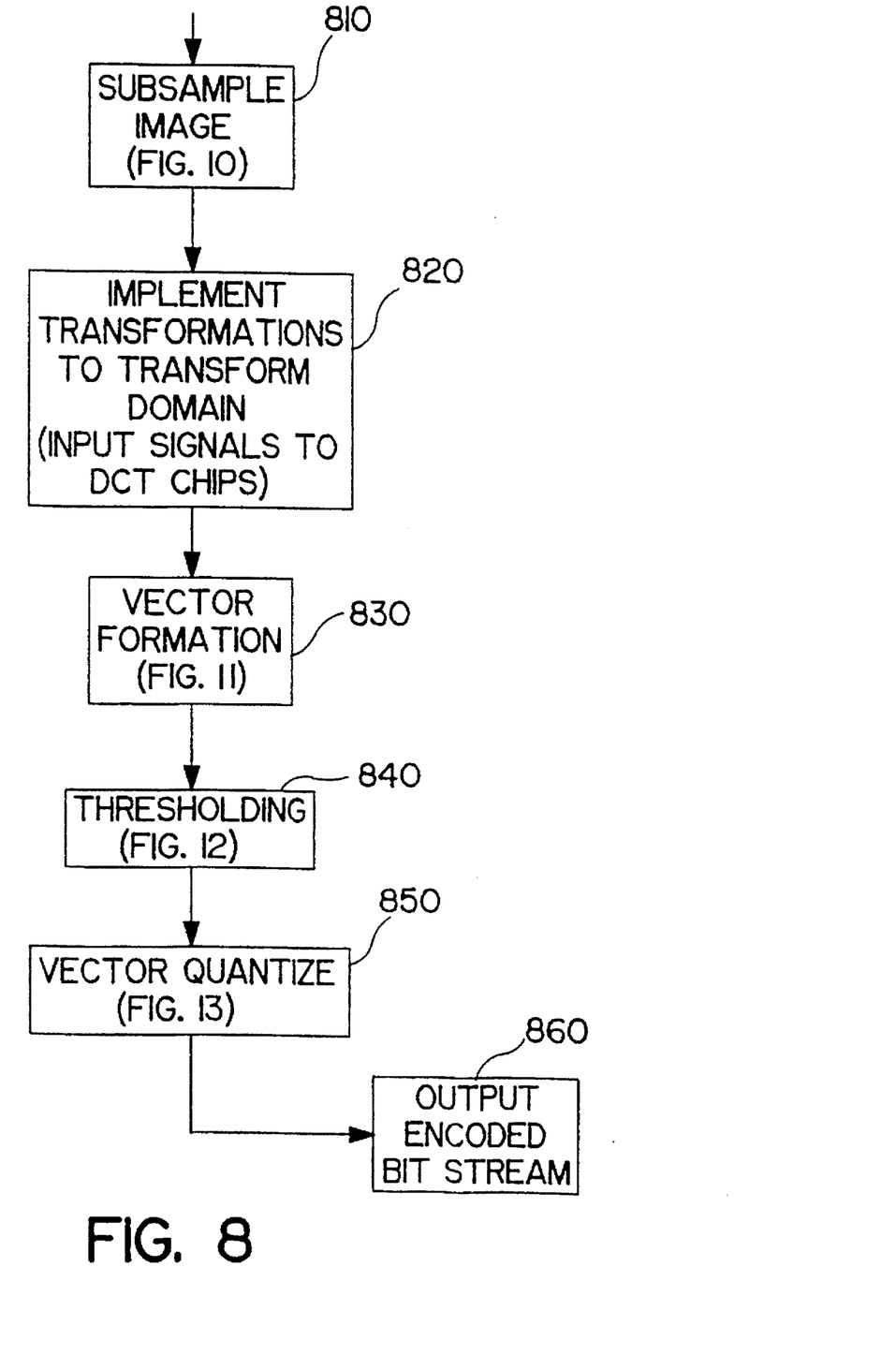
FIG. 8 is a flow diagram of a routine that can be utilized to program the encoder processor in accordance with an embodiment of the invention.

FIG. 8 is a flow diagram of a routine for controlling the processor 110 of encoder 105 to perform encoding in accordance with an embodiment of the invention. It will be understood that some or all of the functions described in terms of programming processor 110 may alternatively be implemented in hardware and specifically designed for speed and efficiency of processing. The block 810 represents a routine, described in conjunction with FIG. 10, for obtaining the subsampled offset images of the original image 100, as illustrated in conjunction with FIG. 2. The block 820 represents the implementation of transformations which transform signals from the image domain to the transform domain. In the illustration of the present embodiment, the transform used is a DCT transform. The processor controls inputting of the signals to be transformed to the DCT chips represented in FIG. 1 at 133, and blocks of DCT coefficients are obtained as illustrated in conjunction with FIG. 3. The block 830 represents the routine of vector formation, described in further detail in FIG. 11, to obtain the vectors illustrated in conjunction with FIG. 4. A routine for thresholding the vectors, described in further detail in FIG. 12, is then performed (block 840) to implement thresholding of the type described in conjunction with FIGS. 5–7. The vectors are then quantized, as represented by the routine of block 850, which is described in conjunction with FIG. 13. The encoded bit stream is then output, as represented by the block 860.

Figure 9:
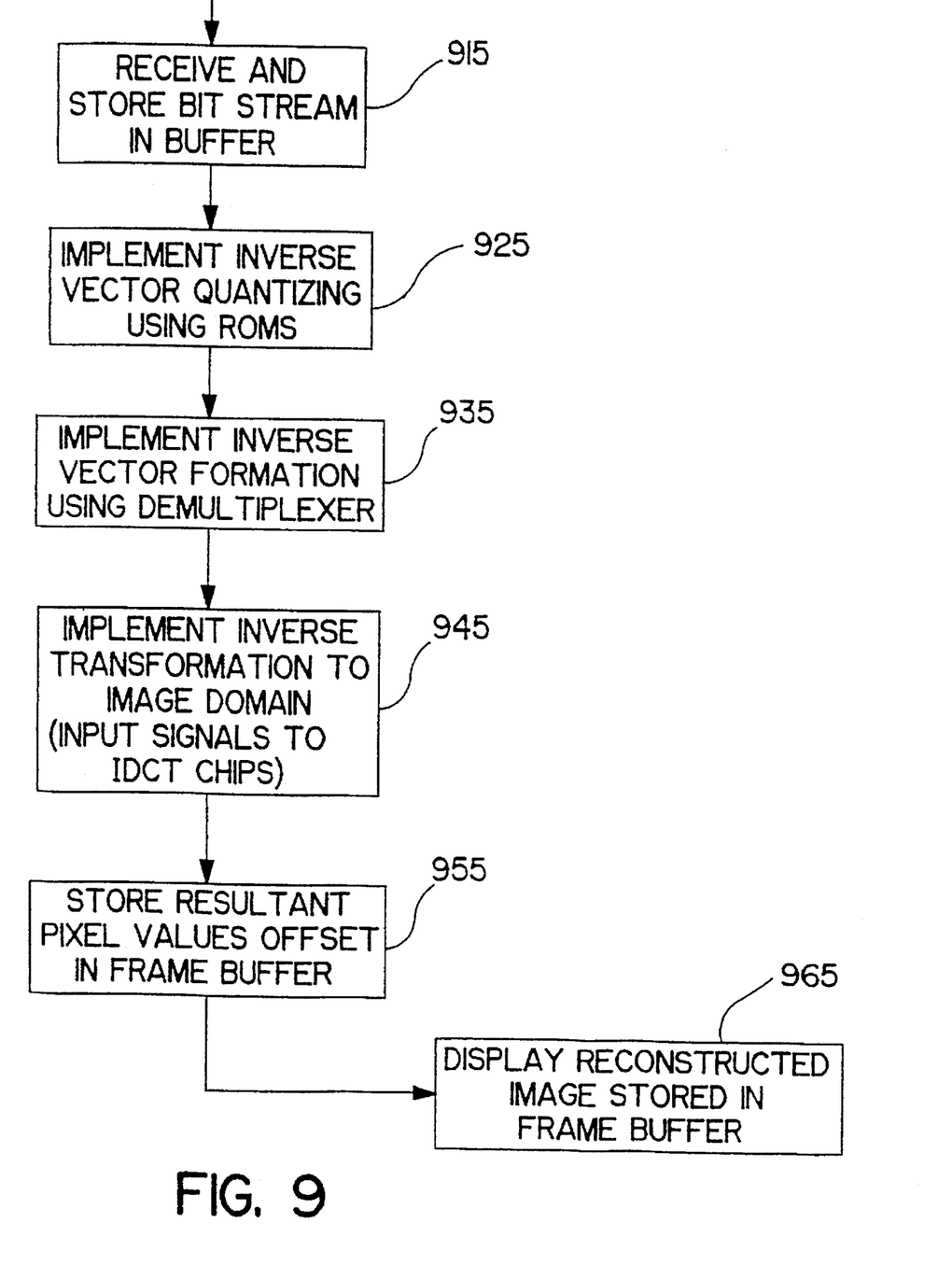
FIG. 9 is a flow diagram of a routine that can be utilized to program the decoder processor in accordance with an embodiment of the invention.

FIG. 9 is a flow diagram of a routine for programming the processor 160 of decoder 155 to implement decoding in accordance with an embodiment of the invention. Again, some or all functions may, if desired, be advantageously implemented in hardware for advantages in speed and efficiency. The block 915 represents the receiving and storing of the bit stream, such as via receiver 162, and the storage thereof in one of the frame buffers 185. Inverse vector quantizing can then be implemented, for example using the ROMs 169 of the decoder system 155. As previously described, the ROMs 169 are loaded with the known vector values corresponding to the code words of the previously described code books. Upon receiving a six bit input representative of a code word, the ROM will output to the processor a forty eight bit output which represents a 2×2×12 vector which can be stored in one of the frame buffers 185. The block 935 represents implementation of inverse vector formation using demultiplexer 190 of the decoder 155 in order to separate, in the manner previously described, the vector values into DCT coefficient values associated with blocks of individual frame components. The block 945 represents the implementation of inverse transformations to the image domain, which can be conventionally performed by IDCT chips 195 of the decoder 155. The resultant pixel values can be stored in one of the frame buffers 185 in the inverse of the offset manner first described in conjunction with FIG. 2, as represented by the block 955. This reconstructed image can then be displayed (block 965) on monitor 176, as shown at 100'.

Figure 2:
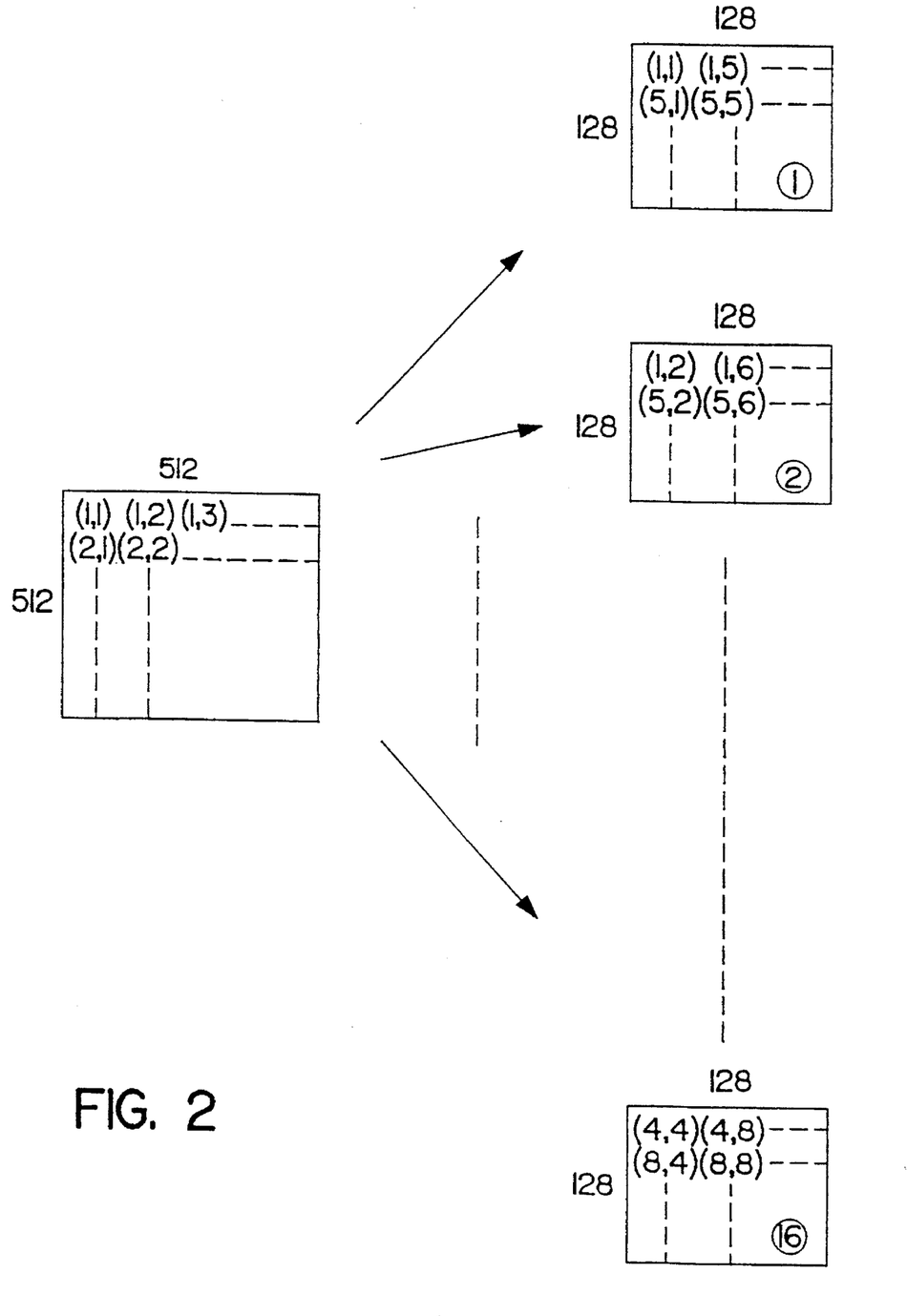
FIG. 2 is a diagram of subsampling of a type that can be used in an embodiment of the invention.
Figure 10:
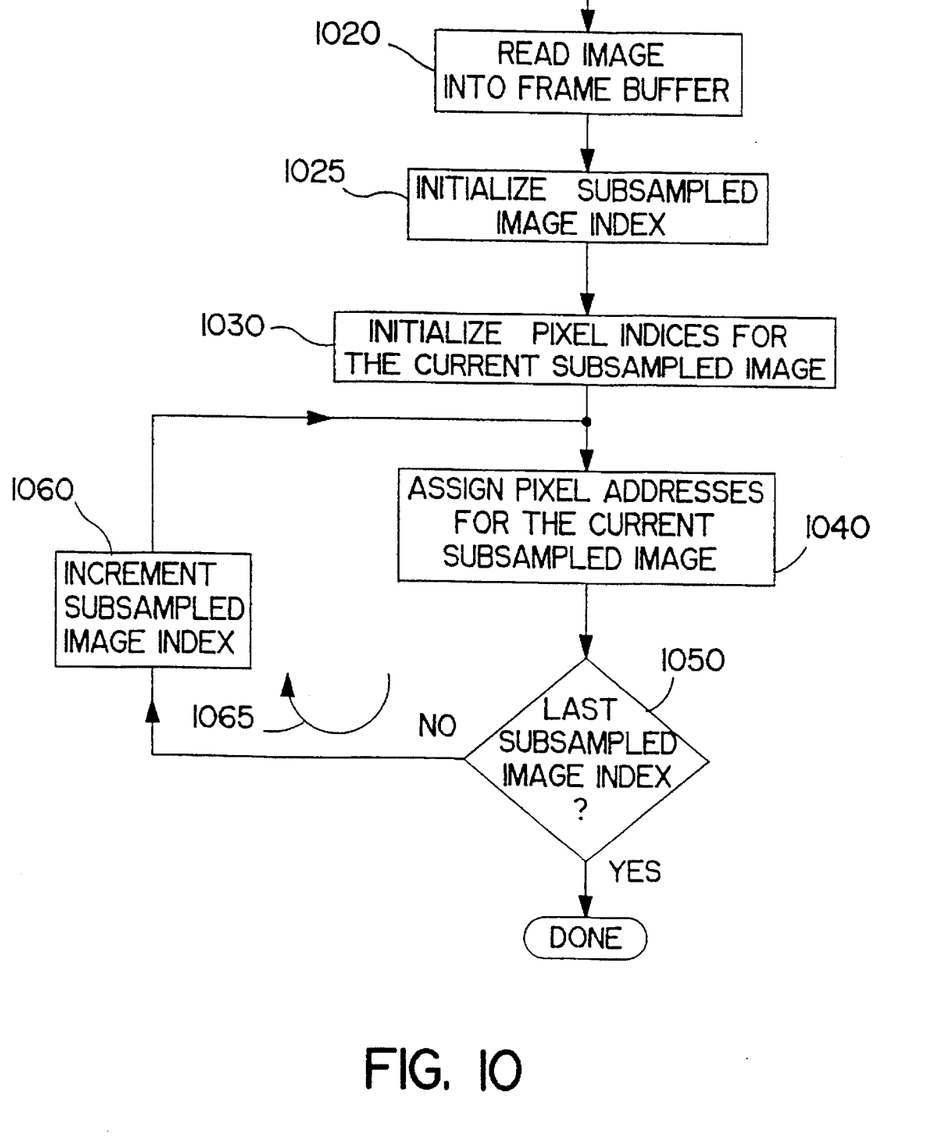
FIG. 10 is a flow diagram of an embodiment of the subsampling routine of FIG. 8.

FIG. 10 is a flow diagram of the routine represented by the block 810 of FIG. 8 for obtaining the subsampled images (for example, 16 of them, as first illustrated in FIG. 2). The image is read into a frame buffer 130 (block 1020). It will be understood that the subsampled images can be stored in sixteen separate small buffers, or can just be retained as a 512×512 image in its original frame buffer, with the address locations of the pixels in each subsampled image being identified for subsequent processing. In the flow diagram of FIG. 10 a subsampled image index is initialized (block 1025), and pixel indices are initialized for the current subsampled image (block 1030). Pixel addresses are then assigned for the current subsampled image, as represented by the block 1040. Inquiry is then made (decision diamond 1050) as to whether the last subsampled image index has been reached and, if not, the subsampled image index is incremented (block 1060), the block 1040 is re-entered, and the loop 1065 is continued until pixel addresses have been assigned for all of the offset subsampled images, as illustrated in FIG. 2.

Figure 11:
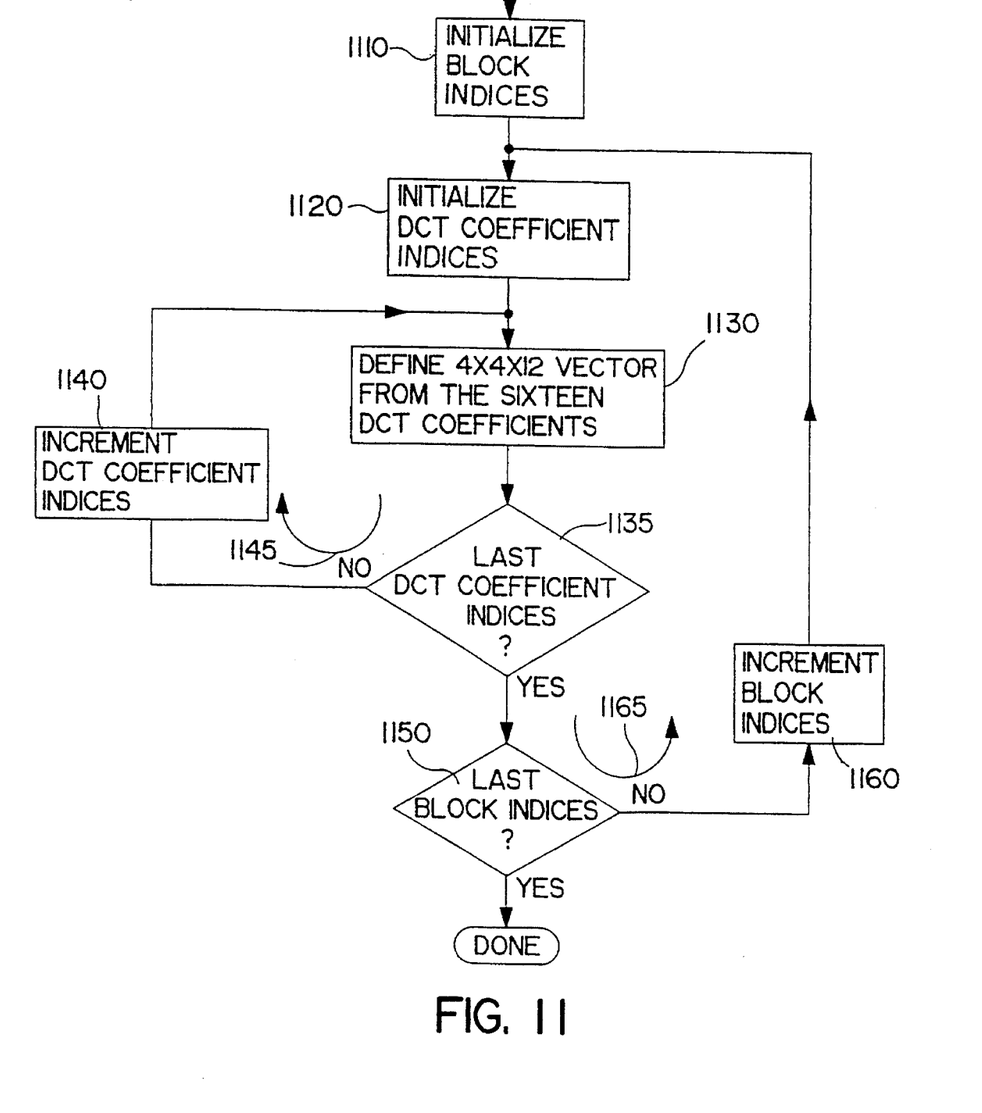
FIG. 11 is a flow diagram of an embodiment of the vector formation routine of FIG. 8.
Figure 12:
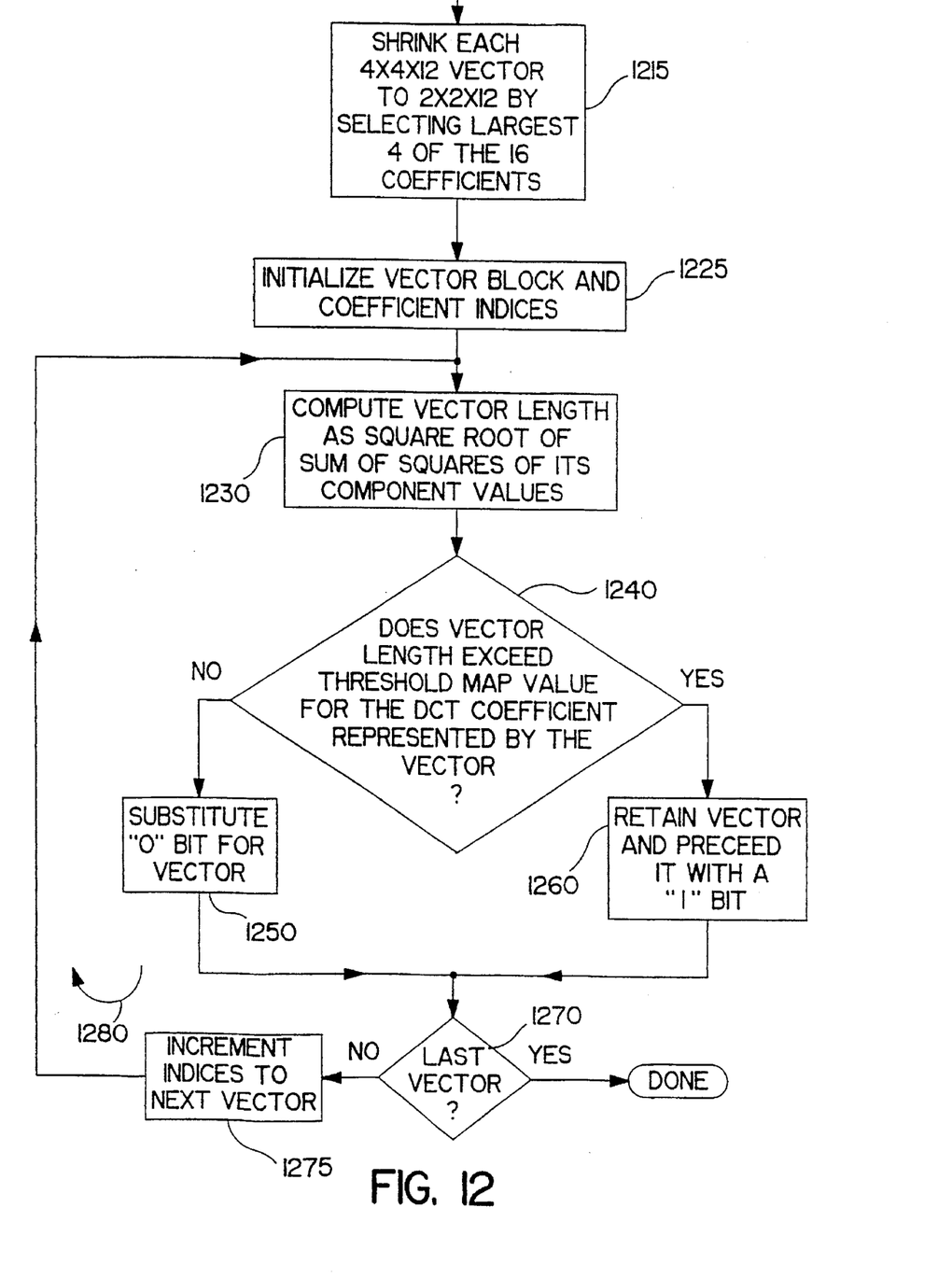
FIG. 12 is a flow diagram of an embodiment of the thresholding routine of FIG. 8.

FIG. 11 is a flow diagram of the routine of block 830 of FIG. 11 relating to vector formation. The block 1110 represents the initializing of block indices, and the block 1120 represents the intializing of DCT coefficient indices. These are illustrated, for example, in FIG. 4. A 4×4×12 vector is then defined from the sixteen DCT coefficients for the current block indices and the current DCT coefficient indices (block 1130). [Reference can be made to FIG. 4.] Inquiry is then made (diamond 1135) as to whether the last DCT coefficient indices have been reached. If not, the DCT coefficient index (or indices, when the end of row is reached) is incremented (block 1140), the block 1130 is re-entered, and the loop 1145 continues until all DCT coefficient indices have been processed for the current block. Inquiry is then made (diamond 1150) as to whether the last block indices [block (16,16) in the example of FIG. 4] have been reached. If not, the block index (or indices, when the end of row is reached) is incremented (block 1160), the block 1120 is reentered, and the loop 1165 is continued until all blocks of FIG. 4 have been processed to obtain vector formation from the already existing information.

FIG. 12 is a flow diagram of the routine represented by the block 840 of FIG. 8, for implementing thresholding, as previously described. If shrinking of vectors is to be performed, the block 1215 implements this function, which is achieved by selecting the largest 4 of the sixteen vector coefficients in order to shrink each vector to 2×2×12 vectors. Thresholding then proceeds by initializing the vector block and coefficient indices (block 1225) and then computing (initially for the first DCT coefficient in the first block) the vector length as the square root of the sum of squares of the vector's component values (block 1230). Inquiry is then made (decision diamond 1240) as to whether the vector length exceeds a threshold map value for the DCT coefficient represented by the vector, an example of a threshold map having been previously illustrated in FIG. 6. If the vector length is smaller than the threshold map value, the block 1250 is entered, this block representing the substituting of a "0" bit for the vector. If the vector length exceeds the threshold map value, the block 1260 is entered, the vector is retained unaltered, and it is preceded with a "1" bit. In either case, decision diamond 1270 is then entered, and inquiry is made as to whether the last vector has been reached. If not, the coefficient and/or block indices are incremented (block 1275), the block 1230 is re-entered, and the loop 1280 is continued until all vectors have been subjected to the thresholding procedure.

Figure 13:
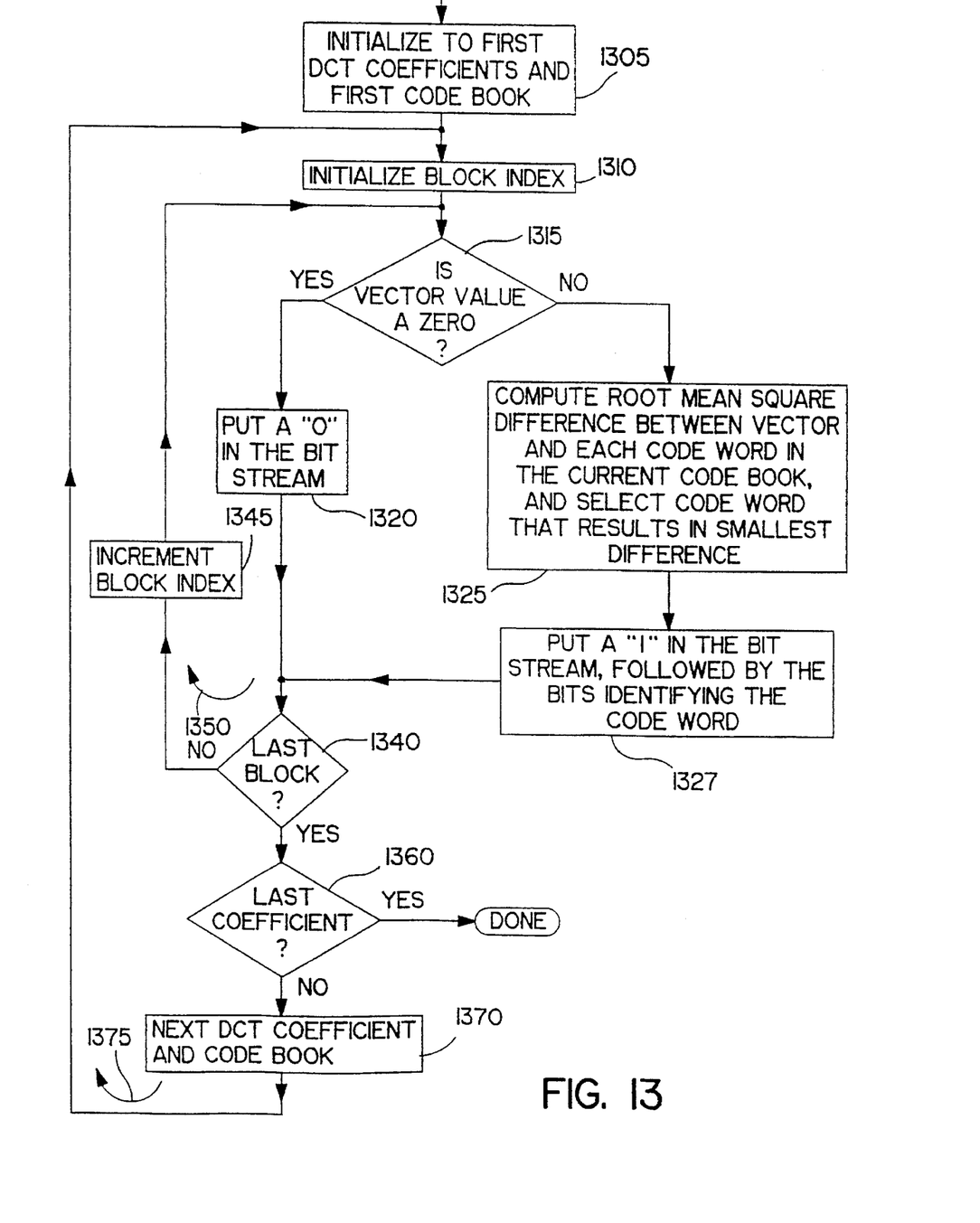
FIG. 13 is a flow diagram of an embodiment of the vector quantizing routine of FIG. 8.

FIG. 13 is a flow diagram of the routine represented by the block 850 of FIG. 8 for quantizing the vectors using the previously described "code books", the information of which can be stored in the VQ ROMs 139 of encoder 105 (FIG. 1). The block 1305 represents initializing to the first DCT coefficient and the first code book (of 64 code books, in the previously described example hereof). The block index is initialized (block 1310), and inquiry is made (diamond 1315) as to whether the vector value for the current DCT coefficient and block index is a zero. If so, a "0" bit is put in the bit stream (block 1320). If not, the block 1325 is entered, this block representing the computing of the root mean square difference between the vector and each code word in the current code book, to select the code word that results in the smallest difference. A "1" bit is then put in the bit stream, followed by the bits (6 bits in the example first described above) identifying the code word. Inquiry is then made (decision diamond 1340) as to whether the last block has been reached. If not, the block index is incremented (block 1345), diamond 1315 is re-entered, and the loop 1350 is continued until the last block has been reached. Inquiry is then made (diamond 1360) as to whether the vectors for the last coefficient have been processed. If not, the block 1370 is entered, this block representing the incrementing to the next DCT coefficient and the corresponding next code book. The block 1310 is then re-entered, and the loop 1375 is continued until the inquiry of diamond 1360 is answered in the affirmative, whereupon the vector quantizing routine is complete.

Figure 14:
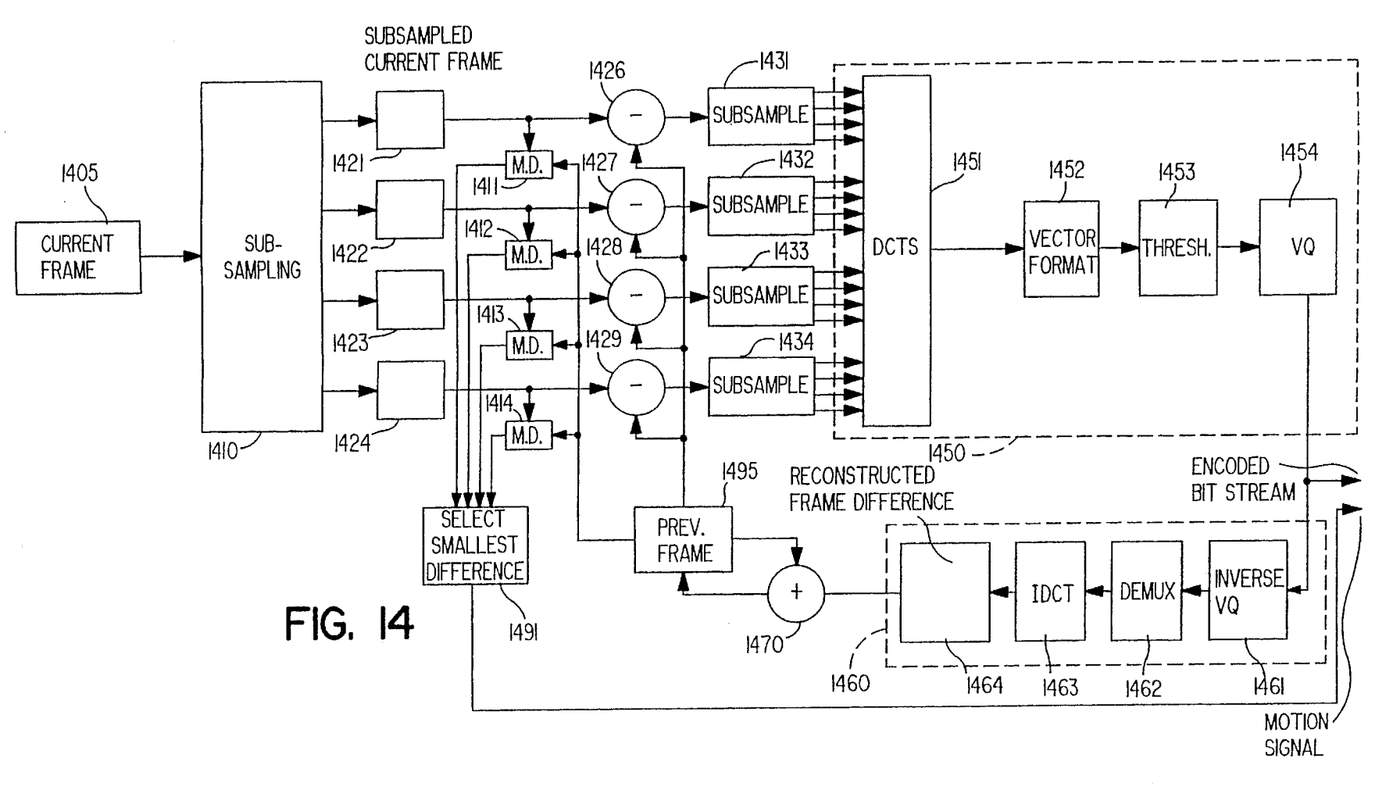
FIG. 14 is a block diagram of a further embodiment of the invention for encoding and decoding video images.

Referring to FIG. 14, there is shown a block diagram of an embodiment of the invention which can be utilized for bandwidth compression of a video signal. In general, processing of individual frames can make use of the techniques previously described for a still image, but further processing can be utilized to take advantage of well recognized temporal correlations in video signals. In the illustrated embodiment, it is assumed that the current frame 1405 of the video signal is again 512×512. It is preferred to obtain the encoded signal from offset subsampled video frames which collectively contain the entire image information. In FIG. 14, the subsampling is indicated as being implemented by a block 1410, the output of which is coupled with frame buffers 1421–1424 that hold the subsampled current frame. Subtractors 1426–1429 subtract the pixel information in the subsampled versions of the current frame from the corresponding pixel information in a previous frame, stored in a buffer 1495, and generated in a manner to be described. The difference signals can be visualized as frames of difference information that can be processed in the manner described above with respect to the processing of an individual image. The subsampling of these difference images is represented by the blocks 1431–1434. The next portion of processing, indicated within dashed region 1450, is similar to the above-described image encoding, and includes the transformation (block 1451), vector formation (block 1452), thresholding (block 1453), and vector quantization (block 1454), the output of which is the encoded bit stream for the difference images. This encoded bit stream can be decoded using the above-described type of processing (in dashed region 1460) that includes inverse vector quantization (block 1461), demultiplexing to decompose the transformed vectors (block 1462), inverse DCT (block 1463), and accumulation in the buffer 1464 to obtain the reconstructed difference frame. The previous frame is continuously obtained using a sum (block 1470) of previous frame and difference frame. A motion signal can be developed and sent with the encoded bit stream by comparing the previous frame pixels or groups of pixels with the offset subsampled current frames, using motion detectors (blocks 1411–1414), and selecting the smallest difference (block 1491).

I claim:

1. For use in a system for encoding and then decoding an image, a method for encoding the image, comprising the steps of:

subsampling the image to obtain a plural number of subsampled frames of spatially offset image-representative signals;

transforming each of said subsampled frames to obtain a corresponding number of frames of transform coefficient-representative signals;

forming vector-representative signals from corresponding coefficient-representative signals of the respective frames of coefficient-representative signals; and vector quantizing the vector-representative signals to obtain encoded signals.

2. The method as defined by claim 1, wherein said step of transforming each of said subsampled frames to obtain a corresponding number of frames of transform coefficient-representative signals comprises applying discrete cosine transforms to regions of each of said subsampled frames.

3. The method as defined by claim 1, further comprising performing a thresholding operation on the vector-representative signals to obtain thresholded vector-representative signals, and wherein said vector quantizing comprises vector quantizing the thresholded vector-representative signals.

4. The method as defined by claim 3, further comprising the step of shrinking the vector-representative signals before performing a thresholding operation on the vector-representative signals.

5. For use in a system for encoding and then decoding an image, a method for decoding the image which was encoded by: subsampling the image to obtain a plural number of subsampled frames of spatially offset image-representative signals; transforming each of said subsampled frames to obtain a corresponding number of frames of transform coefficient-representative signals; forming vector-representative signals from corresponding coefficient-representative signals of the respective frames of coefficient-representative signals; and vector quantizing the vector-representative signals to obtain encoded signals; the decoding comprising the steps of:

inverse vector quantizing the encoded signals, and demultiplexing the result thereof to obtain demultiplexed signals;

inverse transforming the demultiplexed signals to obtain image domain signals representative of subsampled spatially offset frames; and combining the image domain signals to recover a decoded image.

6. The decoding method as defined by claim 5, wherein said step of combining the image domain signals comprises combining said signals with spatial offset.

7. For use in a system for encoding and then decoding video signals, a method for decoding the video signals which were encoded by subsampling video signals to obtain, for each image represented by the video signals, a plural number of subsampled frames of spatially offset image-representative signals; transforming each of said subsampled frames to obtain a corresponding number of frames of transform coefficient-representative signals; forming vector-representative signals from corresponding coefficient-representative signals of the respective frames of coefficient-representative signals; and vector quantizing the vector-representative signals to obtain encoded signals; the decoding method comprising the steps of:

inverse vector quantizing the encoded signals, and demultiplexing the result thereof to obtain demultiplexed signals;

inverse transforming the demultiplexed signals to obtain image domain signals representative of subsampled spatially offset frames; and combining the image domain signals to recover a decoded video image.

8. The method as defined by claim 7, wherein said step of combining the image domain signals comprises combining said signals with spatial offset.

* * * * *